United States Patent [19]

Luo

[11] Patent Number: 4,679,862
[45] Date of Patent: Jul. 14, 1987

[54] QUICK-RELEASE WHEELCHAIR AXLE

[76] Inventor: Chung-I Luo, No. 40, Sec. 1, Nan Ya S. Road, Pan Chiao City, Taiwan

[21] Appl. No.: 824,195

[22] Filed: Jan. 30, 1986

[51] Int. Cl.$^4$ .............................................. B60B 27/02
[52] U.S. Cl. ...................................... 301/112; 301/122
[58] Field of Search ............... 301/111, 112, 121, 122, 301/124 R, 126, 128, 131, 115, 119, 113, 117, 118, 120

[56] References Cited

U.S. PATENT DOCUMENTS

| | | | |
|---|---|---|---|
| 2,513,584 | 7/1950 | O'Leary | 301/128 X |
| 3,963,631 | 6/1976 | Schenk | 301/111 X |
| 4,231,670 | 11/1980 | Knoski | 301/121 X |
| 4,392,690 | 7/1983 | Anderson | 301/121 |
| 4,422,660 | 12/1983 | Costello et al. | 301/132 X |
| 4,477,121 | 10/1984 | Atkins | 301/112 |

Primary Examiner—David A. Scherbel
Assistant Examiner—Russell D. Stormer
Attorney, Agent, or Firm—Poms, Smith, Lande & Rose

[57] ABSTRACT

A quick-release wheelchair axle comprising a male member of a coupling device which forms a continuous piece with and is collinear with the axle's axis, the end of the load bearing surface opposite the male member having two lock washer slots for wheel adjustability, the female member of the coupling device having a quick-release ring for ease of axle removal and threads in conjunction with a sleeve and nut which allow for adjustability of the axle against the structure of the wheelchair.

2 Claims, 5 Drawing Figures

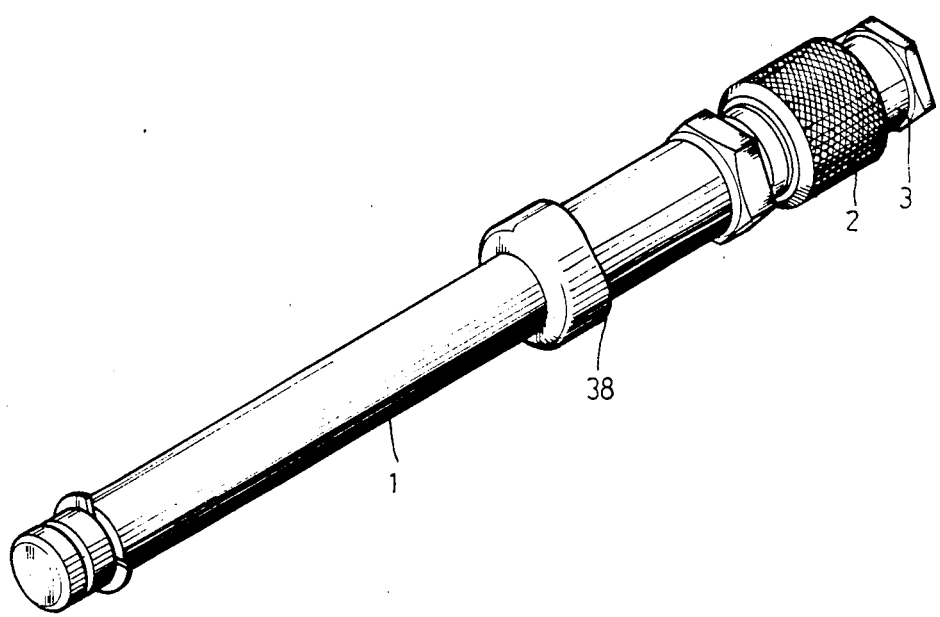
F I G.1

QUICK-RELEASE WHEELCHAIR AXLE

BACKGROUND OF THE INVENTION

This invention relates to a new and improved wheelchair axle, wherein a coupling device is directly integrated into said axle. In previous designs, wheelchairs have had normal axles wherein the nuts had to be removed by means of some type of wrench. Also, in previous designs, there was no means of interchanging different sized wheels on the same axle.

SUMMARY OF THE INVENTION

A primary object of the present invention is to provide a method of quickly removing the wheel of a wheelchair wherein a coupling device is directly incorporated into the wheelchair's axle.

Another object of this invention is to provide said axle with two lock washer slots in order to allow for adjustability to different sized wheelchair hubs.

A further object of this invention is to provide an adjustment sleeve which would not only insure the stability of the axle relative to the axle, but would also allow for extra adjustability of said axle to different sized wheelchair hubs.

Further objects and advantages of the present invention will become apparent as the following description proceeds, and the features of novelty which characterize the invention be pointed out with particularity in the claims annexed to and forming a part of this invention.

BRIEF DESCRIPTION OF THE DRAWINGS

FIG. 1 is a perspective view of the quick-release wheelchair axle;

DETAILED DESCRIPTION OF THE PREFERRED EMBODIMENT

As seen in FIG. 1, the quick-release axle consists of three main parts; the axle (1), quick-release ring (2), and female member of the coupling (3).

Figure 2:
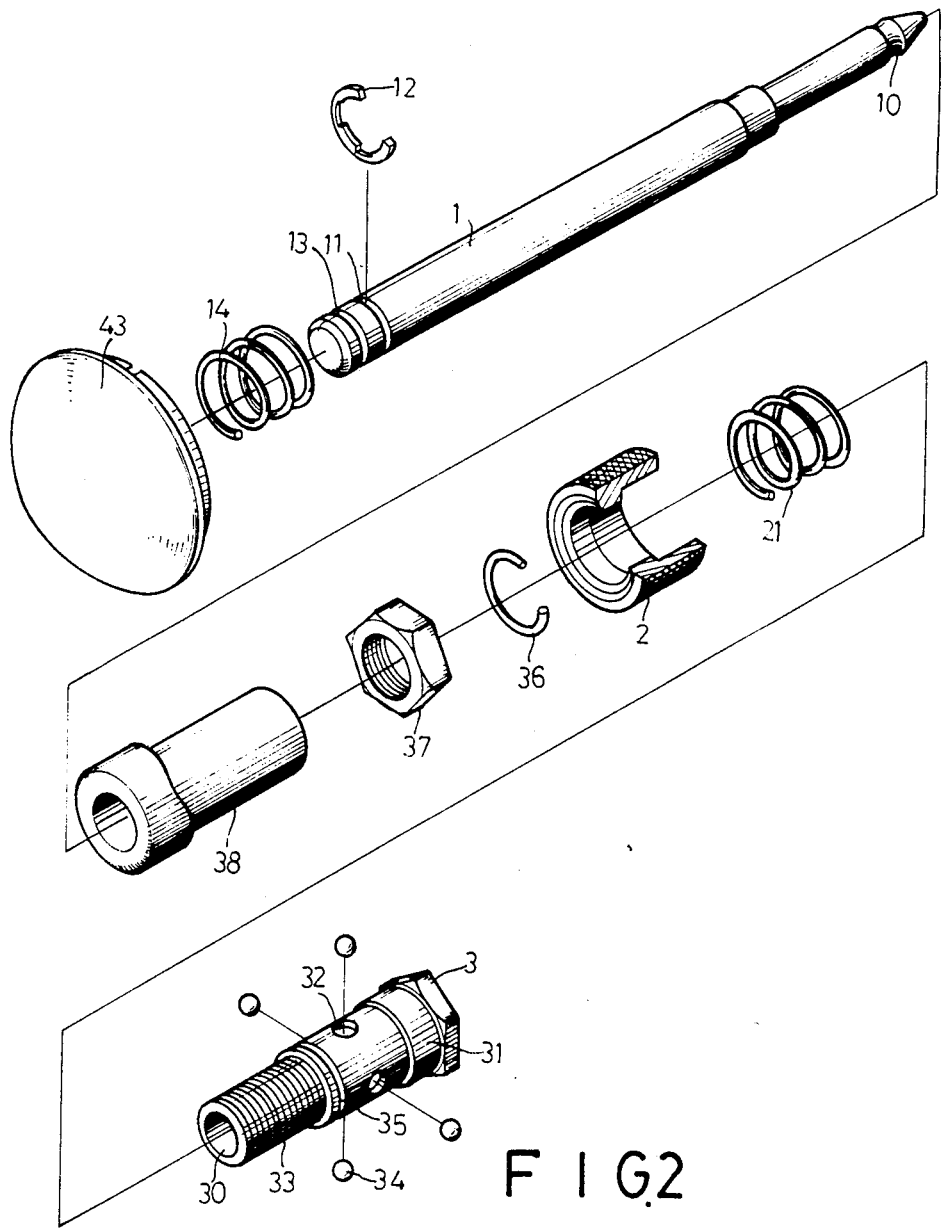
FIG. 2 is an exploded view of the wheelchair's modified axle, including the cover.

Referring to FIG. 2, it may be seen that the axle (1) and the male member of the coupling (10) are integrated into one piece having the same axis. At the opposite end of the axle from the male connector (10) are two identical lock washer slots (11 and 13) which circumscribe the axle's diameter. The lock washer (12) may be placed in whichever slot is most suitable for a given hub (41) (Shown in FIG. 3). Covering the slotted end of the axle is a conventional hub cover (43), which is held in place by the cover spring (14). All other parts shown in FIG. 2 are attached, connected, or are an intergral part of the female member of the coupling (3).

Figure 3:
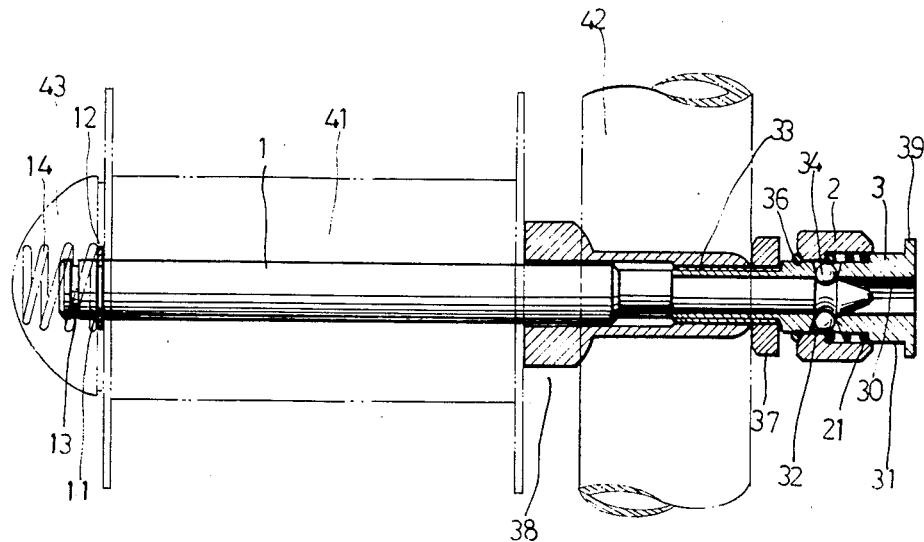
FIG. 3 is an elevational view of the quick-release wheelchair axle, wherein the structure of the wheelchair and the hub are shown by hidden lines.
Figure 4:
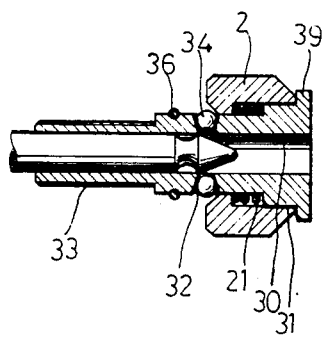
FIG. 4 is a cutaway view of the female member of the coupling device.
Figure 5:
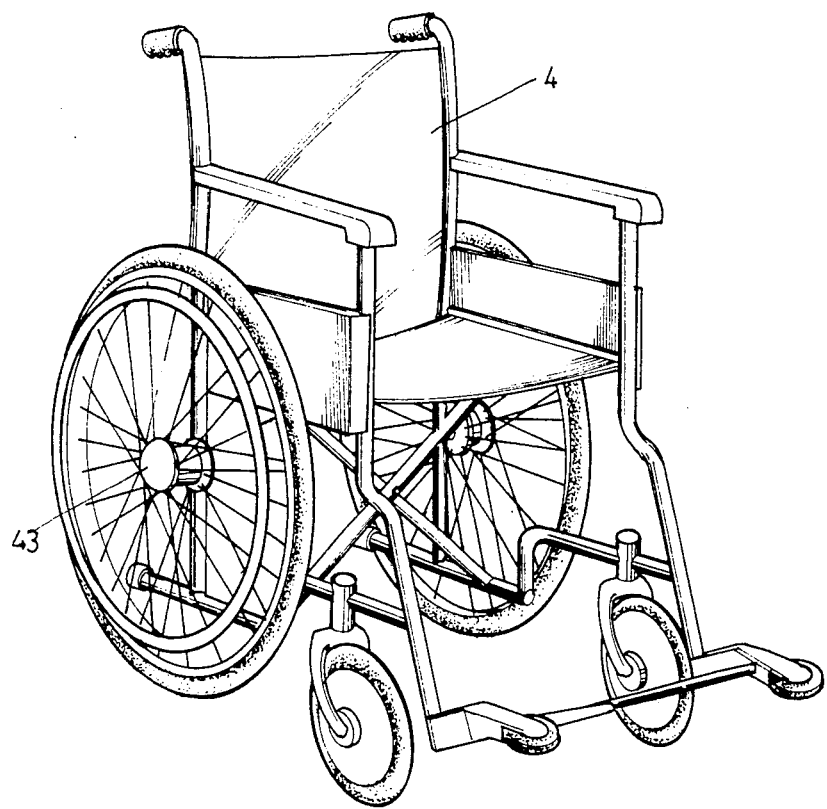
FIG. 5 is prior art of a wheelchair, for reference purposes.

Incorporated into and forming the surface of the female member of the coupling (3) on the end facing towards the male connector (10) are sleeve adjustment threads (33). The release ring sleeve (31) and the ball bearing slots (32), and the release ring stop (39) are integral parts of the female part of the coupling device. The ball bearings (34) are held in place by the release ring (2). Referring to FIG. 3, it can be seen that the release ring (2) is retained by a lock ring (36). The release ring engagement spring (21) keeps the release ring (2) in a normally closed (NC) position. FIG. 4 shows the female member of the coupling in open position.

Returning to FIG. 3, it can be seen that the sleeve (38), and the sleeve adjustment nut (37), may be adjusted along the sleeve threads until they are snug against the structure of the wheelchair (42) and the hub (41).

Referring to FIGS. 1 and 3, the removal of the axle may be thus exemplified; the release ring (2) is pulled back to the release ring stop (39), so that the coupling is in the position illustrated in FIG. 4, the axle (1), in the most common case together with the hub (41), is then slid out of the receptacle (33) so that removal is complete, thereby avoiding the use of tools.

Also, referring to FIGS. 1 and 3, it can be seen that by changing the lock washer (12) between the two lock washer slots (11 and 13) and adjusting the sleeve (38), this present quick-release axle could be fitted to varying sized hubs (and hence varying sized wheels), thereby providing interchangeability between axles and hubs.

As various possible embodiments might be made of the above invention, and as various adaptations might be made in the embodiment above set forth, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A quick-release wheelchair axle comprising a coupling device which is directly incorporated into said axle of the wheelchair wherein the male member of the coupling extends forth from one end of said axle along the axis of said axle a female member of said coupling with a receptacle running completely through it, threads forming the outer surface of the end of said female coupling oriented towards the male connector, a release ring maintained in a normally closed position by a release ring spring on the end of said female member opposite said threads, ball bearings within ball bearing slots on said female member which, in close position, are retained by said release ring, a lock ring to restrain the release ring on the end of said female coupling closest to said threads, a sleeve adjustment nut and a sleeve which may be adjusted along said sleeve adjustment threads.

2. A quick-release wheelchair axle, as set forth in claim 1, wherein a sleeve rests between the hub of the wheelchair's wheel and the adjustment nut, wherein the curved portion of the sleeve coincides with the wheelchair's structure.

* * * * *